(12) United States Patent
Low

(10) Patent No.: US 9,684,350 B2
(45) Date of Patent: Jun. 20, 2017

(54) CALIBRATION SCHEME FOR IMPROVING FLEXIBILITY ON PLATFORM IMPLEMENTATION

(71) Applicant: Intel Corporation, Santa Clara, CA (US)

(72) Inventor: Chia How Low, Simpang Ampat (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/671,127

(22) Filed: Mar. 27, 2015

(65) Prior Publication Data

US 2016/0282918 A1  Sep. 29, 2016

(51) Int. Cl.
*H03K 17/16* (2006.01)
*G06F 1/26* (2006.01)
*G06F 1/32* (2006.01)

(52) U.S. Cl.
CPC ............ *G06F 1/263* (2013.01); *G06F 1/3243* (2013.01); *G06F 1/3253* (2013.01)

(58) Field of Classification Search
CPC ............... H03K 17/16; H03K 19/0005; G11C 2207/2254
USPC .......................................................... 326/30
See application file for complete search history.

(56) References Cited

U.S. PATENT DOCUMENTS

| 8,212,587 | B2* | 7/2012 | Yeung et al. | ...... H03K 19/0175 326/82 |
| 2002/0063576 | A1* | 5/2002 | Kim | ..................... H03H 11/405 326/30 |
| 2005/0174144 | A1* | 8/2005 | Veredas-Ramirez | G11C 7/1012 326/38 |
| 2008/0061818 | A1* | 3/2008 | Santurkar | .......... H03K 19/0005 326/30 |
| 2012/0092039 | A1* | 4/2012 | Lee | .......................... G11C 7/02 326/30 |
| 2014/0002130 | A1* | 1/2014 | Jang | ........................ H03K 17/16 326/30 |
| 2015/0171830 | A1* | 6/2015 | Low et al. | ................ H03K 3/01 307/18 |

* cited by examiner

*Primary Examiner* — Don Le
(74) *Attorney, Agent, or Firm* — International IP Law Group, P.L.L.C.

(57) ABSTRACT

An apparatus is described herein. The apparatus includes a plurality of electrical components, wherein at least one component is to increase a total impedance at a port. The apparatus also includes a comparator, wherein the comparator is to determine an additional impedance from the plurality of electrical components at the port and adjust the impedance to maintain signal integrity along a trace to the port in response to a device being coupled with the port.

18 Claims, 13 Drawing Sheets

CALIBRATION SCHEME FOR IMPROVING FLEXIBILITY ON PLATFORM IMPLEMENTATION

TECHNICAL FIELD

The present techniques relate generally to mitigating platform resistance. More specifically, the present techniques describe calibration schemes to adjust platform impedance and reference voltages.

BACKGROUND ART

The interconnect architecture to couple and communicate between various platform components can be complex to ensure bandwidth requirements are met for optimal component operation. Furthermore, servers may have high bandwidth requirements, while the mobile devices can sacrifice overall performance for power savings. Yet most devices are designed to provide the highest possible performance with maximum power saving.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
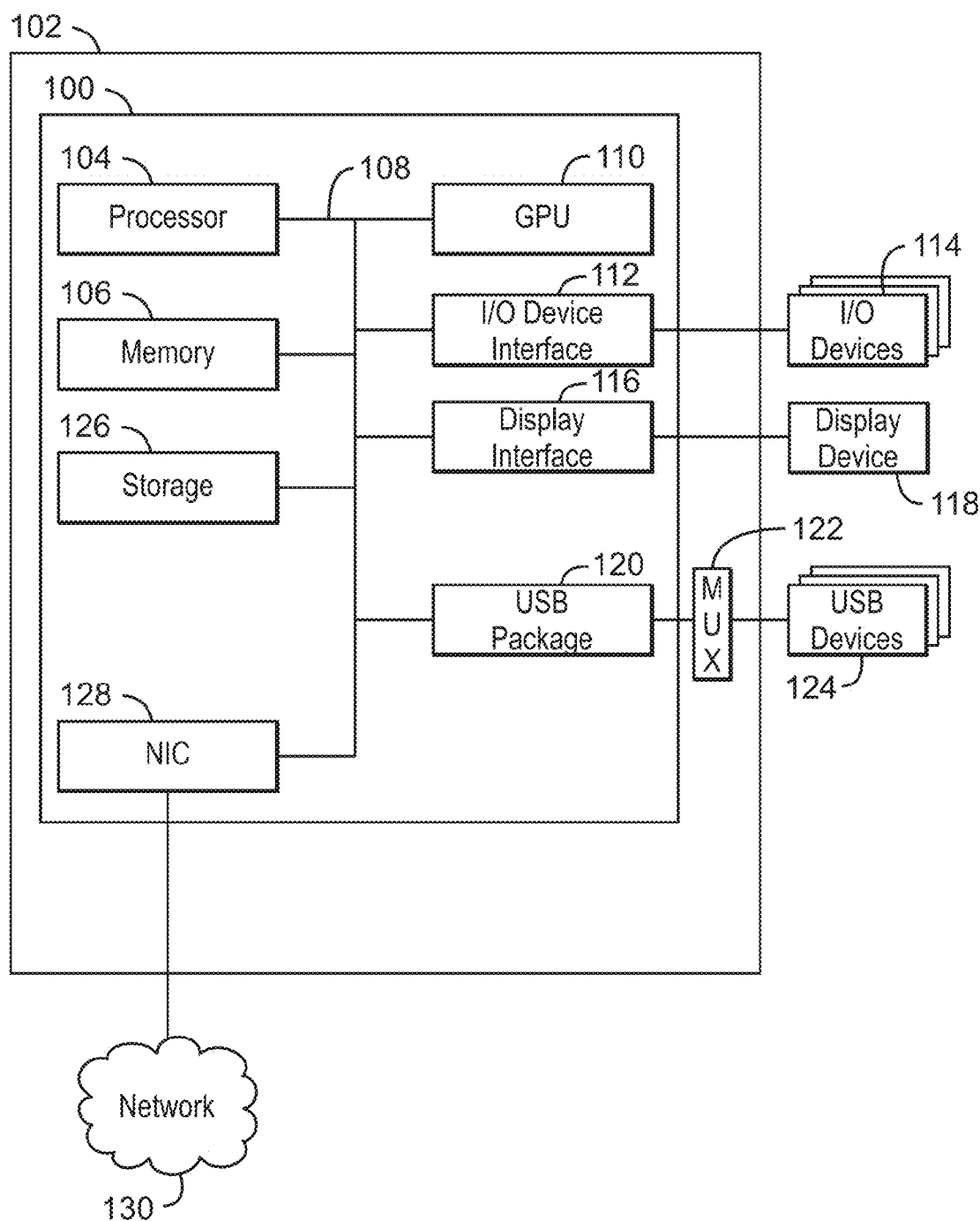
FIG. 1 is a block diagram of a system on chip (SOC) on a printed circuit board (PCB)

Interconnects may include circuitry according various specifications that can be adversely affected by platform resistance resulting from additional platform components added to meet specification requirements. For example, USB2.0 includes base eye opening and voltage output high (Voh) requirements that are to be maintained, even with the addition of components to implement USB3.0, USB Battery Charging, USB On-the-Go, USB, Power Delivery, and so on. In examples, Voh indicates a logic high level according to any USB Specification. Battery charging may be according to the USB Battery Charging (BC) Specification 1.2, released Dec. 7, 2010. The USB Power Delivery (PD) may be according to the USB Power Delivery Specification, Revision 2.0, released Aug. 11, 2014. USB On-the-Go (OTG) may be according to the On-The-Go and Embedded Host Supplement to the USB Revision 2.0 Specification, Revision 2.0 version 1.1a, released Jul. 27, 2012. Additionally, USB Type-C cables and connectors may be according to USB Type-C Cable and Connector Specification Revision 1.0, released Aug. 11, 2014.

USB2.0 refers to the original Universal Serial Bus 2.0 Specification, released in April 2000. Several engineering change notices (ECNs) have been release that modify the original USB2.0 Specification. A number of high speed (HS) eye diagram requirements are defined based on the legacy implementations of the USB as well as process technology. In embodiments, the USB2.0 HS eye diagram is specified at the USB connector, and this point may be referred to as test point two (TP2). Any extra resistance contributed from the platform components or motherboard can have negative effects on the USB2.0 HS eye diagram. Features such as USB OTG, BC, and USB3.0 are typically multiplexed together on a single USB2 µAB port. By adding these extra platform components multiplexed to support and enable more flexible and competitive USB family features, the USB2.0 HS eye performance may be significantly degraded from the additional impedance and may not meet the legacy defined HS eye diagram as prescribed by USB2.0.

To achieve a low power design, USB2.0 can implement a voltage mode driver in high speed (HS) mode, where the Voh or eye opening is very sensitive to the resistance added by additional platform components. The eye opening and Voh level rely on an effective pull up driver impedance (strength) seen at the connector during pull-up state to maintain a clean eye opening. Embodiments described herein implement a high speed voltage mode driver in a USB 2.0 design that can calibrate platform impedance and associated reference voltages. In embodiments, the high speed (HS) pull up driver impedance is detected and adjusted to compensate for the extra resistance contributed by the platform components. This enables a USB2.0 physical layer (PHY) design that is more flexible and competitive without affecting functionality.

Moreover, present techniques can enable a method to detect the extra series resistance contributed by platform components in USB2.0 wires and re-adjust the USB2.0 HS pull-up driver impedance to ensure the effective impedance seen at the USB2.0 connector is maintained at approximately 45 (0) ohms. In embodiments, the present techniques may also can be used to adjust the reference voltage to the disconnect detector as well.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

FIG. 1 is a block diagram of a system on chip (SOC) 100 on a printed circuit board (PCB) 102. The SOC 100 and PCB 102 may be components of, for example, a laptop computer, desktop computer, Ultrabook, tablet computer, mobile device, or server, among others. The SOC 100 may include a central processing unit (CPU) 104 that is configured to execute stored instructions, as well as a memory device 106 that stores instructions that are executable by the CPU 104. The CPU may be coupled to the memory device 106 by a bus 108. Additionally, the CPU 104 can be a single core processor, a multi-core processor, a computing cluster, or any number of other configurations. Furthermore, the SOC 100 may include more than one CPU 104.

The SOC 100 may also include a graphics processing unit (GPU) 110. As shown, the CPU 104 may be coupled through the bus 108 to the GPU 110. The GPU 110 may be configured to perform any number of graphics functions and actions. For example, the GPU 110 may be configured to render or manipulate graphics images, graphics frames, videos, or the like, to be displayed to a user of the SOC 100. The memory device 106 can include random access memory (RAM), read only memory (ROM), flash memory, or any other suitable memory systems. For example, the memory device 106 may include dynamic random access memory (DRAM).

The CPU 104 may be connected through the bus 108 to an input/output (I/O) device interface 112 configured to connect the SOC 100 through various layers of the PCB 102, and components of the PCB 102 to one or more I/O devices 114. The I/O devices 114 may include, for example, a keyboard and a pointing device, wherein the pointing device may include a touchpad or a touchscreen, among others. The I/O devices 114 may be built-in components of a platform including the SOC 100, or may be devices that are externally connected to a platform including the SOC 100.

The CPU 104 may also be linked through the bus 108 to a display interface 116 configured to connect the SOC 100 through various layers of the PCB 102, and components of the PCB 102 to one or more display devices 118. The display device(s) 118 may include a display screen that is a built-in component of a platform including the SOC 100. Examples of such a computing device include mobile computing devices, such as cell phones, tablets, 2-in-1 computers, notebook computers or the like. The display device 118 may also include a computer monitor, television, or projector, among others, that is externally connected to the SOC 100.

The SOC 100 may also include a universal serial bus (USB) package 120. The USB package 120 may include a transmitter and a receiver in order to transmit and receive USB data. The USB package 120 may also include components necessary to implement the USB Battery Charging Specification, USB On-the-Go Specification, and the USB Power Delivery Specification, and the USB Type C Specification. The PCB 102 may also include components to implement the various USB Specifications. Data from the USB package 120 may be sent to a multiplexer (MUX) 122 and on to a plurality of USB devices 124. The MUX 122 may be used to select between various USB features enabled by the USB package 120. For example, the MUX 122 may be used to implement USB 2.0, USB 3.0, USB Battery Charging, or USB Power Delivery, among others.

The SOC 100 may also be coupled with a storage device 126. The storage device may be a component located on the PCB 102. Additionally, the storage device 126 can be a physical memory such as a hard drive, an optical drive, a thumbdrive, an array of drives, or any combinations thereof. The storage device 126 may also include remote storage drives. The SOC 100 includes a network interface controller (NIC) 128 may be configured to connect the SOC 100 through the bus 108, various layers of the PCB 102, and components of the PCB 102 to a network 130. The network 130 may be a wide area network (WAN), local area network (LAN), or the Internet, among others.

It is to be understood that the block diagram of FIG. 1 is not intended to indicate that the SOC 100 is to include all of the components shown in FIG. 1. Rather, the SOC 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate communications between components. For example, embodiments of the present techniques can also be implemented any suitable electronic device, including ultra-compact form factor devices, such as System-On-Chip (SOC) and multi-chip modules. The present techniques may also be used on any electrical cable inside or outside of a computer that is used to carry digital information from one point to another. For example, embodiments of the present techniques may be used for connecting disk drives.

In some examples, the I/O signal traces and the USB signal traces are subjected to an increasing amount of impedance and resistance as additional components are added to the SOC 102 and PCB 102 in order to meet the requirements of various specifications. For example, the USB OTG, USB Battery Charging, and USB Type C Specifications add additional platform components that result in additional platform resistance. Moreover, the multiplexer used to select between USB features can add to the platform resistance. The present techniques may be used to improve the hardware level system design. In particular, physical layer (PHY) high speed design is improved compared to previous designs while enabling a more flexible to platform implementation without adding risk to USB2.0 compliance and functionality issue. In many existing USB2.0 platform designs, there are no physical changes to accommodate for the additional platform components. In these existing designs, the addition of the platform components is merely compensated for through current boosting to obtain a clean eye opening. However, current boosting results in high power consumption, and also limits platform design flexibility, product features, and competitiveness.

Figure 2A:
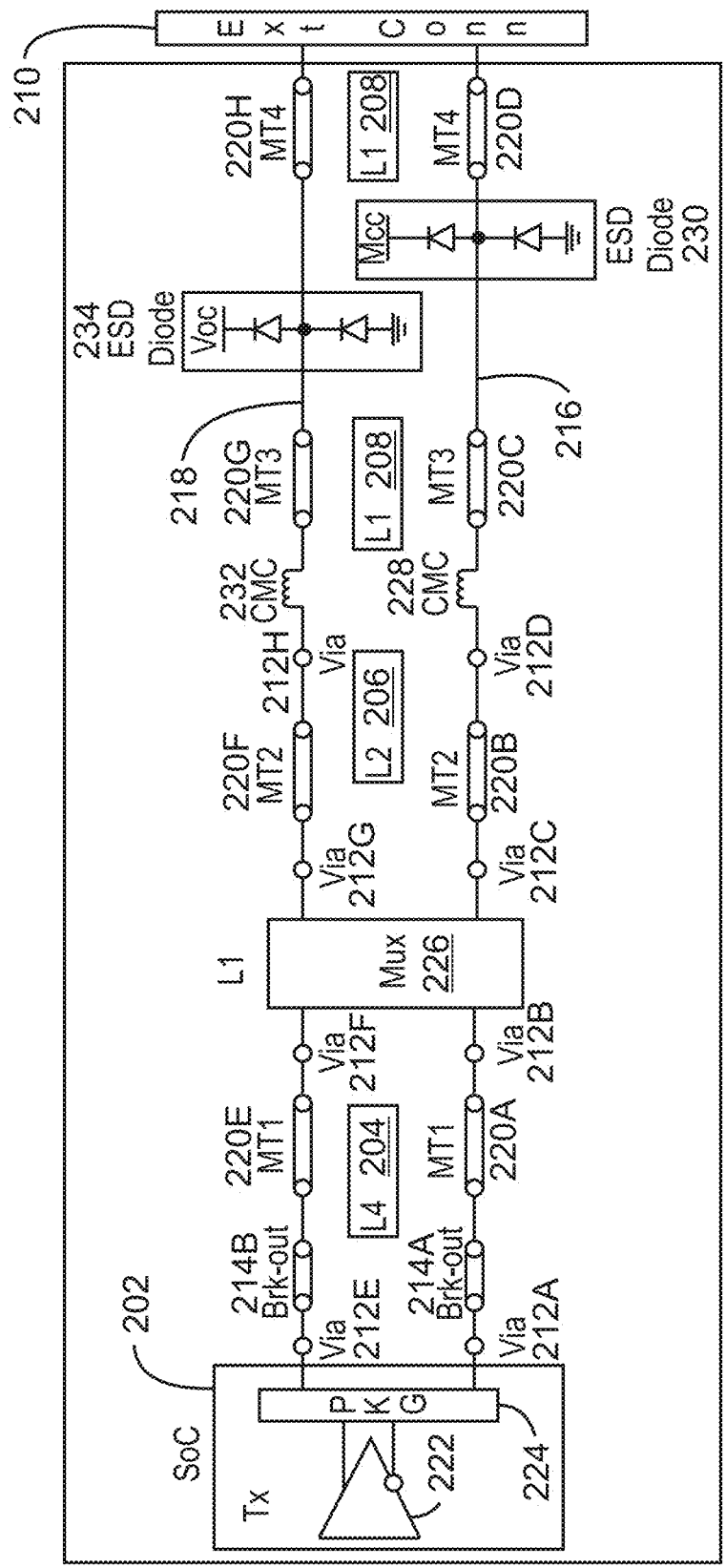
FIG. 2A is an exemplary topology diagram with signal traces on a printed circuit board (PCB)

FIG. 2A is an exemplary topology diagram with signal traces on a printed circuit board (PCB) 200A. In embodiments, the signal traces are USB signals. In the example of FIG. 2A, the PCB 200A is a four layer PCB, however a PCB with any number of layers may be used. An SOC 202 transmits and receives data/signals across layer four (L4) 204, layer two (L2) 206, and layer one (L1) 208 of the PCB to an external connector 210.

A plurality of vias 212 and a plurality of breakouts 214 are used to route a trace 216 and a trace 218 between various areas of metal 220 on each layer of the PCB 200A. In embodiments, the trace 216 and the trace 218 form a differential pair. For example, a transmitter 222 sends data to a package 224 on the SOC 202. This signal is routed across a via 212A to a breakout 214A and across metal one (MT1) 220A on L4 204. Another via 212B routes the data to a multiplexer (MUX) 226, where a selection between various input/output data features can be selected. In embodiments, the multiplexer routes the signal trace 216 to the MUX 226 at L1 using the via 212B. A via 212C routes the signal trace 216 to a metal two (MT2) 220B at L2 206, and a via 212D routes the signal trace 216 to a common mode choke (CMC) 228 at L1 208. The common mode choke is used to filter electromagnetic interference (EMI) and radio frequency interference (RFI) along the signal trace 216. A metal three (M3) 226 routes the trace 216 to a diode 230 via L1 208. The diode 230 is used to rectify current along the signal trace 216. In embodiments, the diode 230 is an electrostatic discharge (ESD) diode that is to protect the circuitry from electrostatic discharge. A metal four (M4) 220D then routes the signal trace to external connector 210.

Trace 218 may be routed in a similar fashion. This signal is routed across a via 212E to a breakout 214B and across metal one (MT1) 220E at L4 204. Another via 212F routes the data to the MUX 226. A via 212G routes the signal trace 218 to a metal two (MT2) 220F, and a via 212H routes the signal trace 218 to a common mode choke (CMC) 232 at L1 208. A metal three (M3) 220G routes the trace 218 to a diode 234. Similar to the diode 230, the diode 234 may be an ESD diode. A metal four (M4) 220H then routes the signal trace to external connector 210.

Figure 2B:
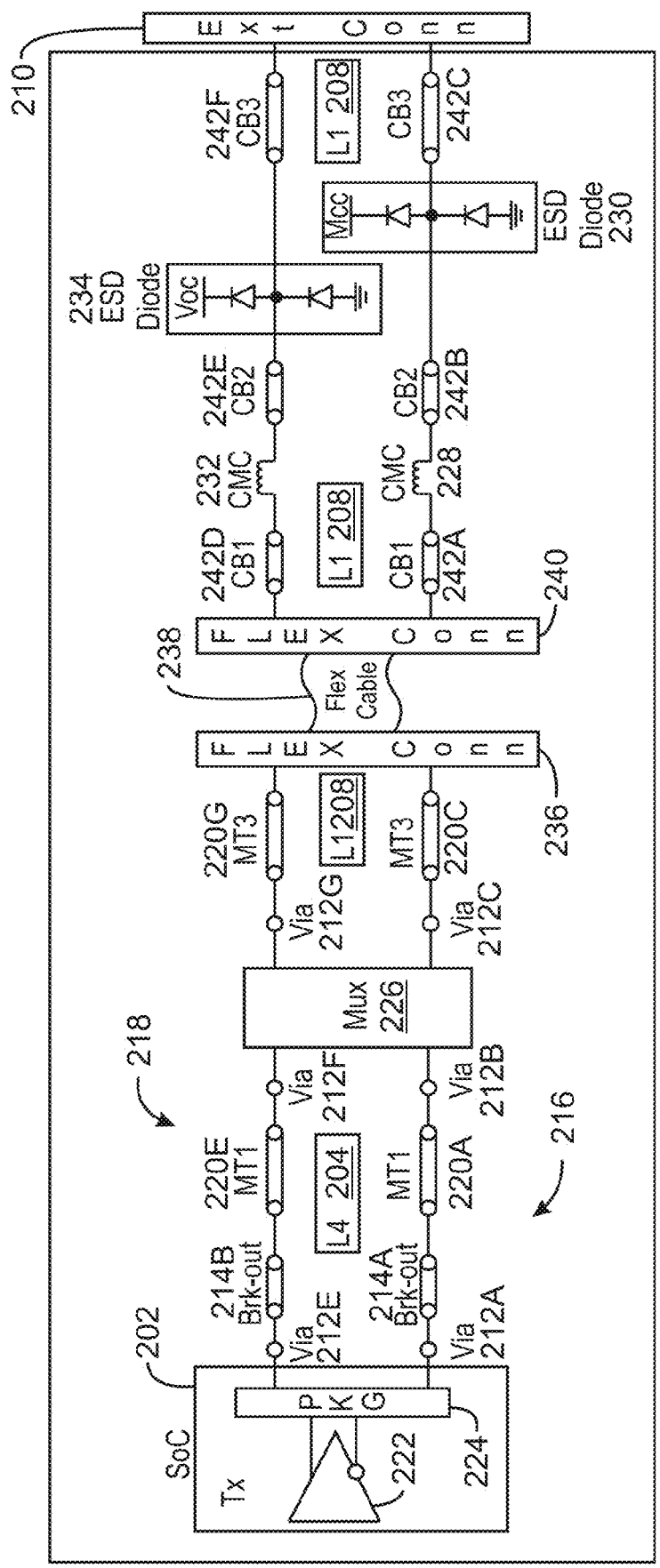
FIG. 2B is an exemplary topology diagram with a flexible connector and a flexible connector coupled by a flexible cable.

As illustrated, several components of the PCB 200A can contribute additional resistance and/or impedance along the signal trace 216. Specifically, the multiplexer 216 can contribute a high amount of resistance along the signal trace 216. Moreover, the routing design of each trace can contribute to the platform resistance observed at each trace. Similar to FIG. 2A, FIG. 2B is another exemplary topology diagram with signal traces on a printed circuit board (PCB) 200B. In embodiments, the signal traces are USB signals. In the example of FIG. 2B, the PCB described is a four layer PCB, however a PCB with any number of layers may be used. Similar to FIG. 2A, a system on chip 202 transmits and receives data/signals across layer four (L4) 204, layer two (L2) 206, and layer one (L1) 208 of the PCB to an external connector 210. However, FIG. 2B includes a flexible connector 236 and a flexible connector 240 coupled by a flexible cable 238. The flexible connectors 236 and 240 and the flexible cable 238 can be used in various PCB designs. However, the flexible connectors 236 and 240 and the flexible cable 238 can contribute additional resistance and/or impedance along each of the signal traces 216 and 218.

In each of FIGS. 2A and 2B, additional resistance and/or impedance can degrade data traveling along the traces 216 and 218. In the case of USB signal traces, these additional components are used to implement various additional USB features, such as USB OTG, USB BC, USB PD, and the like. The additional resistance and/or impedance may result in a degraded eye diagram.

Figure 3:
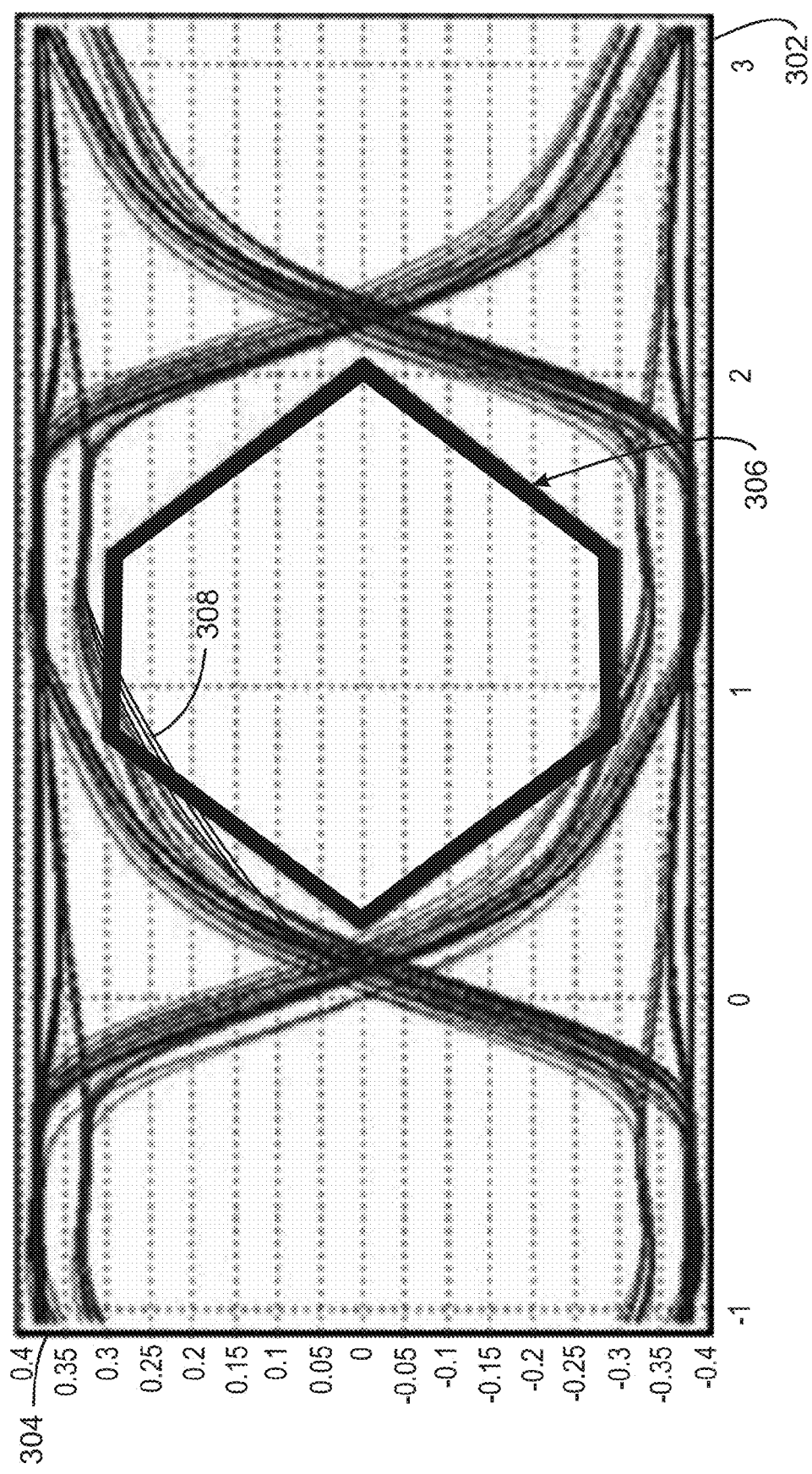
FIG. 3 is an illustration of an eye-diagram.

FIG. 3 is an illustration of an eye-diagram 300. The x-axis 302 is a measure of time called a bit period or unit interval. The y-axis 304 illustrates the amplitude of data along a signal trace, such as the signal trace 216 or 218. In examples, the eye-diagram 300 results from a system that includes the exemplary designs of FIGS. 2A and 2B. When platform components such as a multiplexer contributes about 20Ω of resistance in series with a USB2.0 45Ω driver termination, a total of approximately 65Ω of impedance is observed at the platform. Both USB hosts and USB devices include a high speed termination resistance and a pull-down resistance. The USB2.0 Specification allows for a driver impedance of 45Ω (+/−10%, pull-down resistance of 5 kΩ (+/−5%), and a pull-up resistance should be 1.5 kΩ (+/−5%). In the example of a MUX contributing 20Ω of resistance in series with a USB2.0 45Ω driver termination, the extra platform components have contributed approximately 50% of the original driver impedance. This additional impedance affects not only the USB2.0 compliance but also adds significant risk to USB2.0 functionality. The additional impedance provided by the board/package traces results in higher platform resistance in series with the device termination, and will trigger a higher Voh as observed by a comparator of the USB package. This results in the occluded eye diagram as illustrated in FIG. 3. A diamond 306 that represents an acceptable eye clearance according to the USB2.0 Specification is occluded at reference number 308. When the pull up resistance has been calibrated, the HS eye diagram is corrected closer to an eye diagram of a platform with no components from silicon to a standard connector.

Figure 4A:
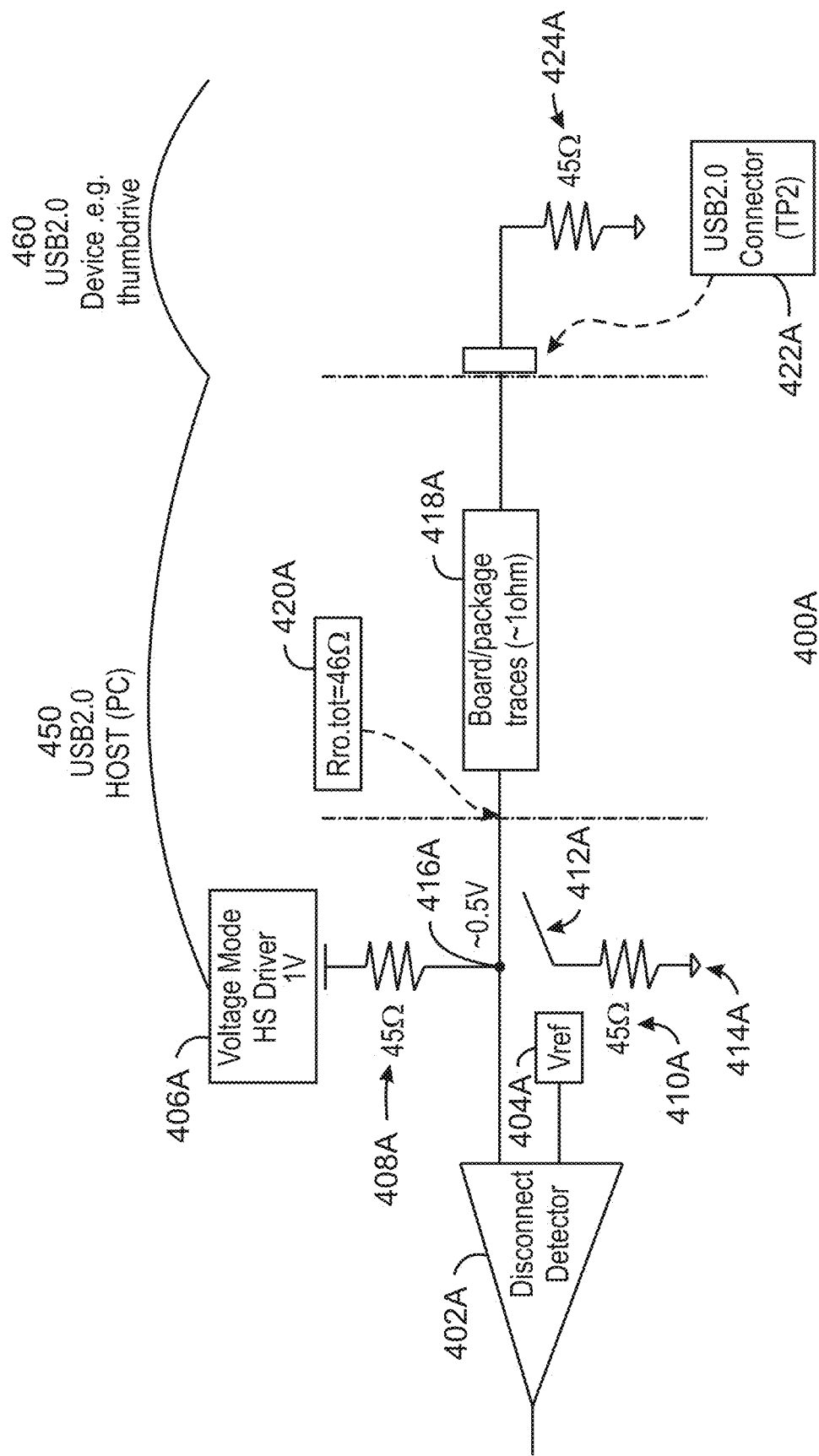
FIG. 4A is an illustration of a USB 2.0 Host/Device platform implementation.

FIG. 4A is an illustration of a USB 2.0 Host/Device platform implementation. Although USB 2.0 is described, the present techniques can apply to serial I/O bus implementation. Accordingly, the present techniques may apply to any of the Universal Serial Bus Revision 3.1 Specification released on Jul. 26, 2013; Peripheral Component Interconnect Express (PCI-E) announced Nov. 29, 2011; or DisplayPort 1.3 (DP). In FIG. 4A, a USB2.0 host 450 is coupled with a USB2.0 device 460. The USB device 460 may be, for example, a thumbdrive. A disconnect detector 402A may be used to determine the connection status of the USB device 460. In embodiments, the disconnect detector 402A is includes a comparator. In order to determine the connection status of a USB connector, a reference voltage (Vref) 404A is used to detect a change in a differential voltage across USB differential traces by comparing the Vref 404A to the differential voltage. The differential voltage can be the difference between two input signals, such as Dp and Dn.

A voltage mode high speed (HS) driver 406A provides a voltage source of 1 volt (V). A voltage of 1V is a generic voltage source (Vcc) for the voltage mode driver design. Accordingly, any voltage mode driver design can be used. Further, the voltage mode driver is generally a driver circuit whose output is a voltage signal, the driver circuit being designed as a voltage source. The voltage is applied to a 45Ω pull-up impedance at reference number 408A. A 45Ω pull-down impedance at reference number 410A is enabled when a switch 412A is closed in order to apply current across the 45Ω resistance at 408A to the 45Ω resistance at the ground 414A to result in a voltage of approximately 0.5 V at reference number 416A. When a device is connected with a 45Ω pull-down impedance, the effective signaling level at 416A will be Vcc/2 (e.g., if Vcc=1 V, then 416A=0.5V).

Accordingly, the USB 2.0 voltage mode driver contributes approximately 45Ω of impedance. In the example of FIG. 4A, additional platform components 418A contribute approximately 1Ω of impedance to the USB 2.0 traces, thus satisfying the USB2.0 Specification. In other words, a total impedance, as measured at reference number 420A, is 45Ω, +/−10%. A USB device at USB connector 422A can operate according to the USB2.0 Specification, as the total resistance of 46Ω is within the prescribed total impedance of the USB2.0 Specification. As illustrated, the device 460 is a USB compliant device with a 45Ω driver pull down. Additionally, with no additional components added, a Voh level at the connector 422A will not be significantly affected by the board/package traces impedance.

Figure 4B:
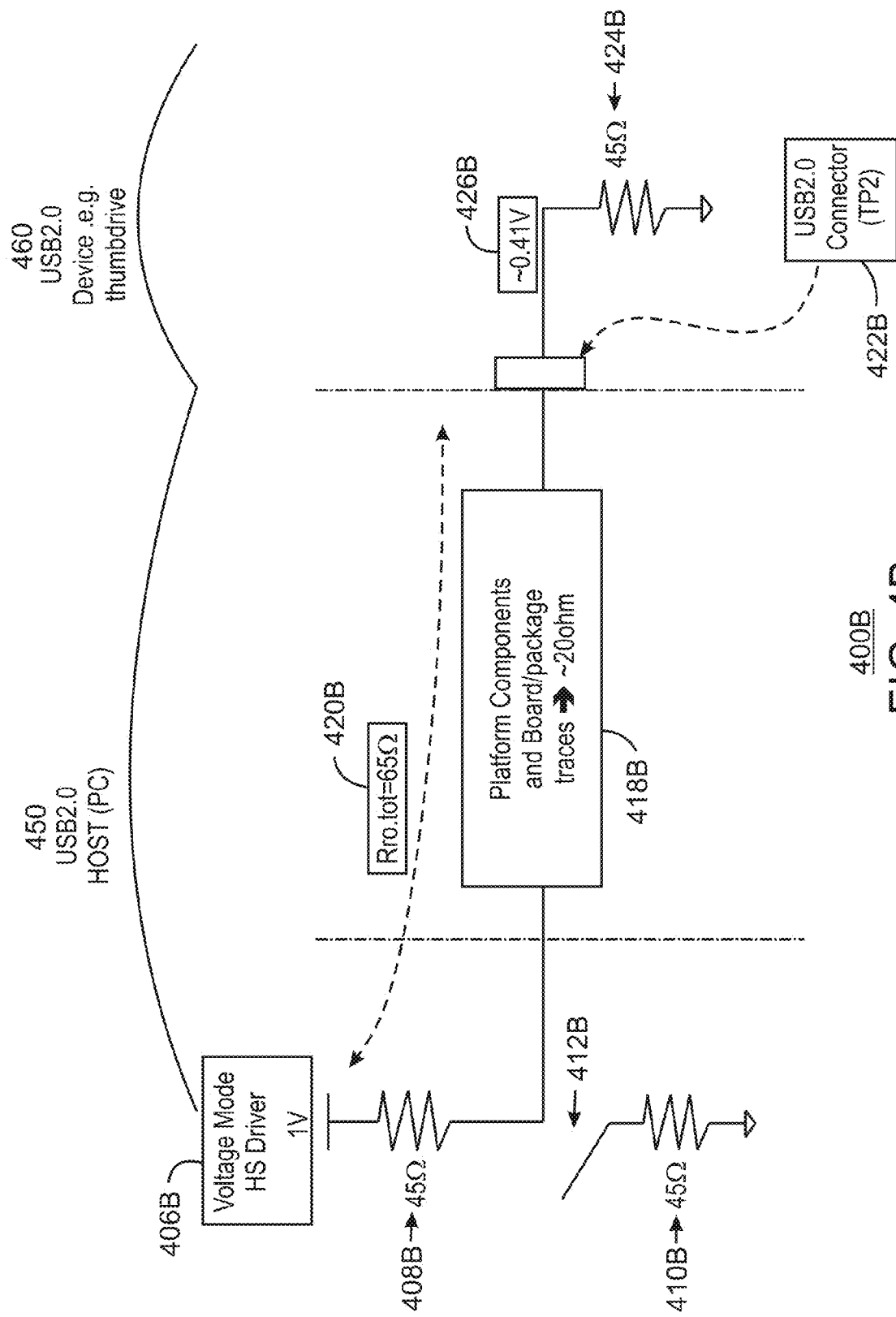
FIG. 4B is another illustration of a USB 2.0 Host/Device platform implementation.

FIG. 4B is an illustration of a USB 2.0 Host/Device platform implementation. Although USB 2.0 is described, the present techniques can apply to serial I/O bus implementation. FIG. 4B is similar to FIG. 4A, however, significant platform components and board/package traces 418B have been added, resulting in an additional platform resistance of approximately 20Ω. The additional platform components may include, but are not limited to, components that are used to realize USB PD, BC, OTG, and a combination USB2.0/USB3.0 port. In FIG. 4B, a weaker eye opening at the transmitter side can reduce the receiving eye marginality at receiver end, which may ultimately trigger the system fails functionality in worst case conditions.

This additional resistance in turn results in a total or effective HS pull-up driver impedance at reference number 420B of 65Ω. The same total impedance of 65Ω is also observed at the connector at reference number 422B when the platform components are in series with the pull-up driver. Under such conditions, a USB device at USB connector 422B may experience several faults. The voltage of approximately 0.41 V at reference number 426B is degraded due to platform resistance.

As shown in FIG. 4B, a HS voltage mode driver Voh and eye opening measured at the USB2.0 connector is very sensitive to the series resistance that contributed by the platform components. The HS eye opening and Voh captured at TP2 422B is significantly degraded when compare to a traditional host only port without extra platform components. In embodiments, a multiplexer is included in the platform components and contributes a large amount of resistance. In order to ensure the device receives high quality, reducing the platform contributed series resistance is necessary. Referring briefly to FIG. 3, at the top of eye diagram 300, the platform resistance also has a direct effect on the Voh level that is seen at the silicon bump of resistance as contributed by the board/package traces 418B as shown in FIG. 4B. The additional resistance provided by the board/package traces 418B results in a higher platform resistance in series with the device termination will and trigger higher a Voh observed by a comparator (disconnect detector) 402 (FIG. 4A), resulting in the occluded eye diagram as illustrated in FIG. 3.

Figure 4C:
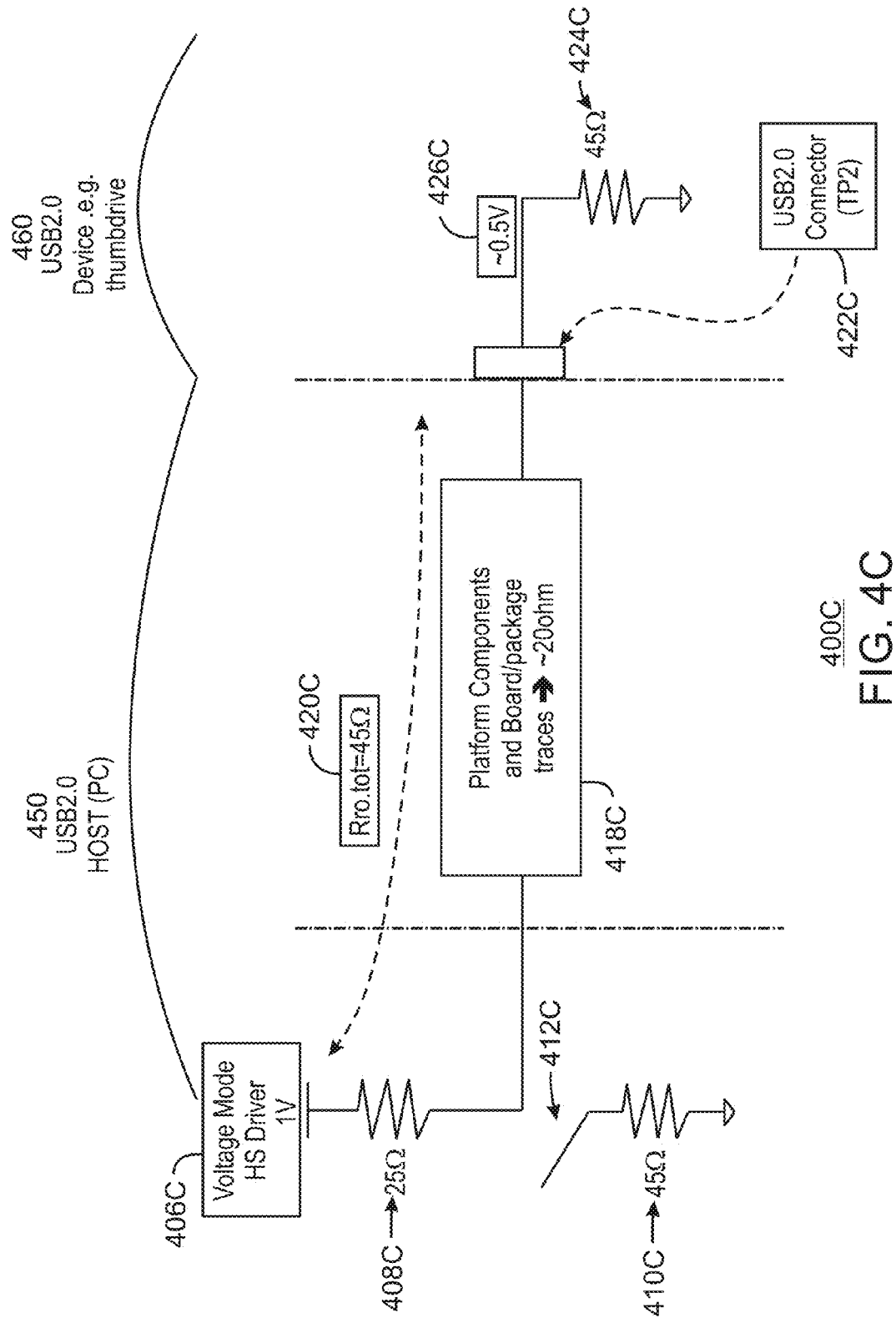
FIG. 4C is an illustration of a USB 2.0 Host/Device platform implementation with a tunable pull-up driver impedance.

FIG. 4C is an illustration of a USB 2.0 Host/Device platform implementation with a tunable pull-up driver impedance. In response to the significant platform components and board/package traces 418C that add an additional platform resistance of approximately 20Ω, the pull-up driver impedance 408C is adjusted to 25Ω to compensate for the additional platform components. This results in a total effective impedance of 45Ω, within the requirements of the USB2.0 Specification. Moreover, the line voltage at reference number 426C is approximately 0.5V, within the requirements of the USB2.0 Specification.

Accordingly, the present techniques are used to cancel the effects on resistance and/or impedance by the platform components. The platform pull-up driver impedance can be detected and then adjusted to ensure the effective pull-up impedance seen at the connector is closer to 45Ω. In embodiments, the pull-up driver impedance detection is to begin when the device is connected and a "pull-down" exists. A pull-down according to the USB Specification includes a 45Ω termination to ground. An internal comparator can detect the Voh to identify the platform resistance, then map the offset value of the pull-up driver impedance thru a look up table.

In embodiments, the adjustment of the pull-up driver impedance can occur during a period called chirping. According to USB2.0 protocol, whenever an USB2.0 device is connected, both host and device perform a series of handshakes, called a chirp, to identify the host/device speed capability. The chirping event occurs at a very low frequency and is identified for detection and impedance adjustment without affecting performance and functionality requirements of the chirp period. During the chirping period, both the host and the device check for timing duration of a signal at various voltage levels, without a determination of the particular voltage level. Accordingly, small changes in the voltage level at low frequency chirp signals (less than 25 kHz) due to HS pull up driver impedance adjustment will not affect the chirp period functionality.

Figure 5:
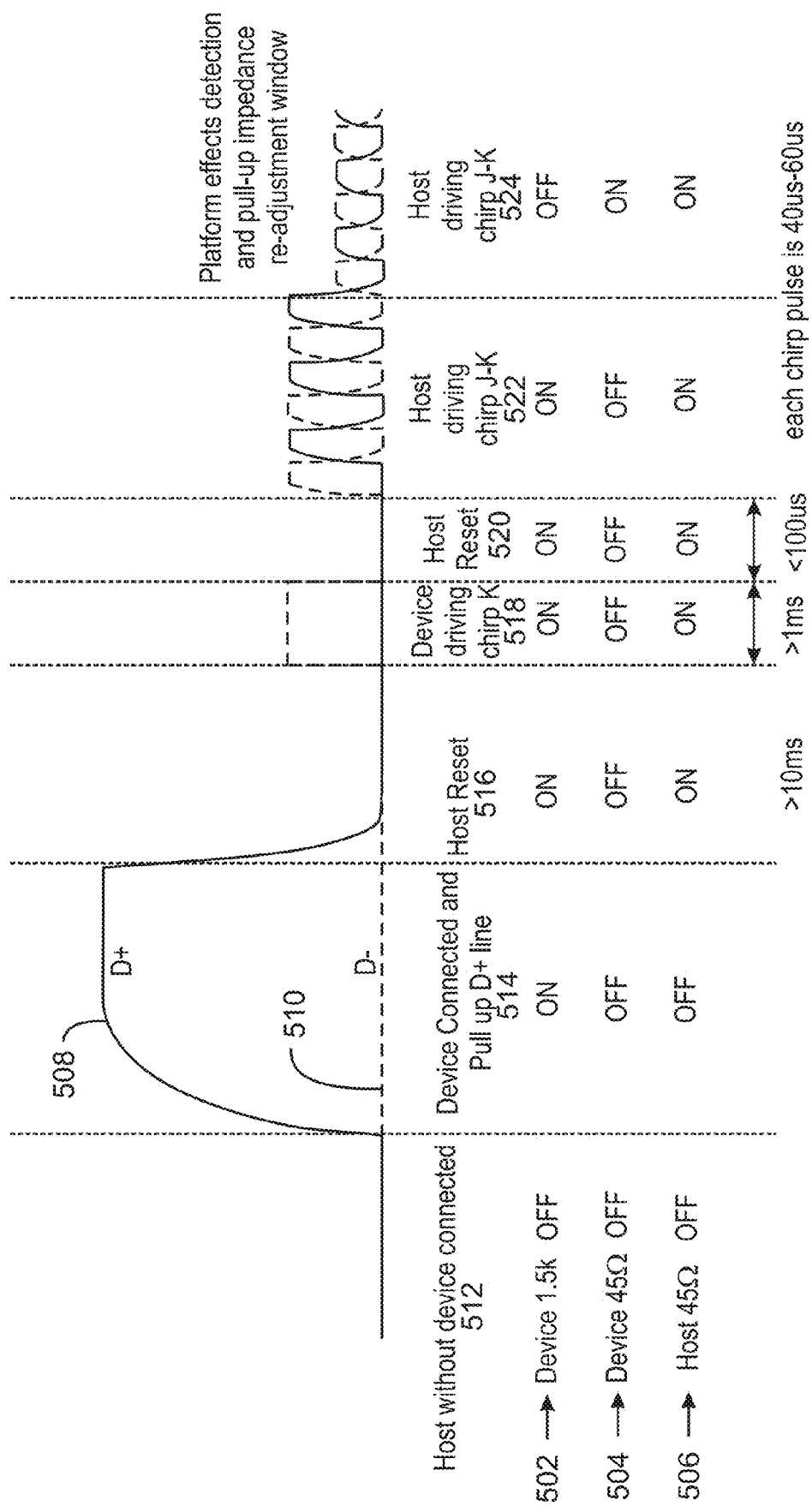
FIG. 5 is an illustration of a chirp sequence including a pull-up impedance adjustment.

FIG. 5 is an illustration of a chirp sequence 500 including a pull-up impedance adjustment. A status is indicated for each of a 1.5 kΩ pull-up resistor of the device 502, a 45Ω pull-down resistor of the device 504, and a 45Ω pull-up resistor of the host 506. A D+ signal is illustrated by the solid line at reference number 508, and a D− signal is illustrated by the dotted line at reference number 510. Several time windows 512-524 are illustrated during the sequence 500.

At window 512, the device is not connected to the host. Accordingly, each of the 1.5 kΩ pull-up resistor of the device 502, a 45Ω pull-down resistor of the device 504, and a 45Ω pull-up resistor of the host 506 are OFF. At window 514, the device is connected, resulting in the D+ signal line being driven high. In particular, the 1.5KΩ pull-up resistor 502 of the high-speed USB device pulls the voltage of the D+ signal line 508 up to 3V, which results in the host detecting the newly attached device.

At window 516, in response to the attached device, the host drives the D+ signal line 508 and the D− signal line 510 to ground. The host may assert a reset signal to drive both the D+ signal line 508 and the D− signal line 510 to ground. During this window, the 1.5 kΩ pull-up resistor of the device 502 remains ON, while the 45Ω pull-down resistor of the device 504 is OFF and the 45Ω pull-up resistor of the host 506 is ON. The host reset lasts at least more than 10 milliseconds (ms). At window 518, the high-speed USB device can announce its speed by pulling the D− signal line 510 up to approximately 800 mV. Pulling the D− signal line 510 up to approximately 800 mV results in a Chirp-K on the USB. The USB device chirp lasts at least more than 1 ms.

At window 520, another host reset state occurs as both the D+ signal line 508 and the D− signal line 510 are driven to ground. The D+ signal line 508 and the D− signal line 510 are driven to ground for less than 100 microseconds (μs). At window 522, the host begins to drive a J-K chirp. The host sends an alternating sequence of Chirp-K's and Chirp-J's. During their respective chirp, the high voltage level of the D+ signal line 508 and the D− signal line 510 is equal to approximately 800 mV. Moreover, during window 522, the 1.5 kΩ pull-up resistor of the device 502 remains ON, while the 45Ω pull-down resistor of the device 504 is OFF and the 45Ω pull-up resistor of the host 506 is ON. Each chirp pulse is approximately 40 μs to 60 μs is length.

At window 524, after the sequence Chirp K-J-K-J-K-J, the high-speed USB device disconnects the D+ pull-up resistor 502 and enables the high speed device termination 504 and operates in a high-speed mode. At this moment, the high voltage levels of the D+ signal line 508 and D− signal line 510 are pulled down to 400 mV since the D+ signal line 508 and D− signal line 510 are respectively connected to pull-down resistors (45Ω). It is during window 524 where the platform can detect effects of added resistance from platform components and board/package signal traces, and also adjust the host pull up impedance.

In embodiments, the detection and adjustment can be done at the last window when device physical layer (PHY) has started to turn on the 45 ohm pull-down termination 504 while the host continues driving a low frequency Chirp K-J signal. For the device PHY, the device Chirp-K period right after the first host reset will be identified as a detection and adjustment window. However, to avoid confusion, the techniques described focus on the USB2.0 design as the host PHY. Additionally, the same information from impedance detection can be used to re-adjust the reference voltages used by the disconnect detector and also any other receivers such as a Squelch detector to accommodate the platform complexity and non-compliant devices.

Figure 6A:
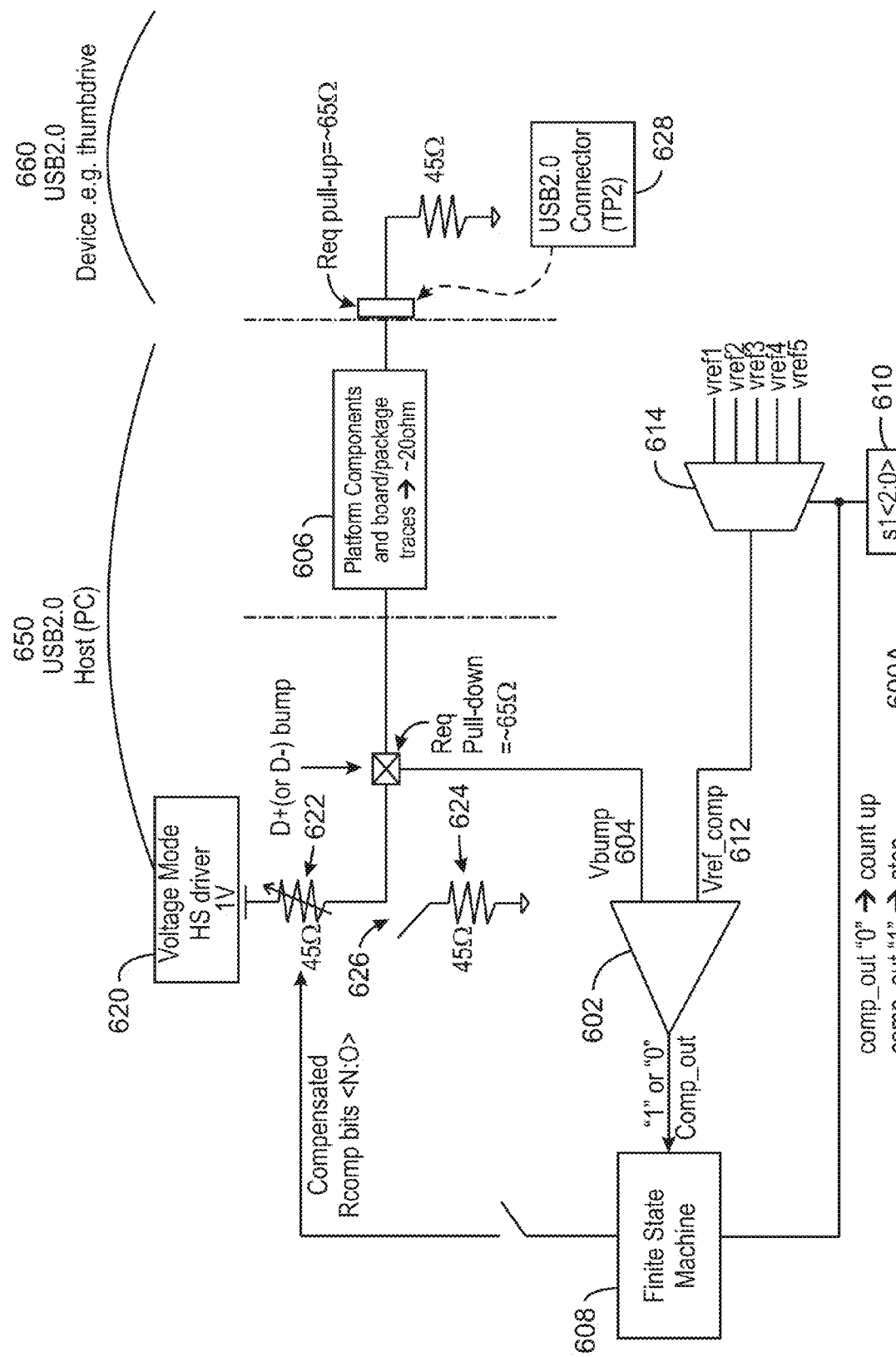
FIG. 6A is an illustration of the platform components resistance detection mode.

The present techniques include both a platform resistance detection mode and a HS pull-up driver impedance adjustment mode. FIG. 6A is an illustration of the platform components resistance detection mode. A voltage mode HS driver 620 provides a voltage source (Vcc) of 1 V. The voltage is applied to a 45Ω pull-up impedance at reference number 622. A 45Ω pull-down impedance at reference number 624 is provided when a switch 626 is closed.

In the example of FIG. 6A, additional platform components 606 contribute approximately 20Ω of impedance to the USB 2.0 traces resulting in a total impedance, as measured at the USB2.0 connector (TP2) 628, of 65Ω. In embodiments, Vbump voltage level and the platform resistance value 606 can be estimated using a voltage divider concept or a resistor divider concept with the known voltage source (Vcc) of 1 V, the sensed Voh level, and the 45Ω pull-up impedance at reference number 622. In the voltage divider concept, various values can be determined since the resistors in series divide the voltage, and current in one resistor is equivalent to the current in the other resistor. Since the detection occurs while the host is driving the Chirp K-J at a very low frequency (almost DC) during the window 522 as described with respect to FIG. 5, the voltage divider concept may be applied to obtain Vbump and a platform resistance value. Table 1 illustrates sample values determined using the voltage divider concept.

The voltage reference (Vref) in Table 2 can be determined based on the estimated Vbump level in Table 1.

TABLE 1

Lookup Table for Platform Resistance Compensation

| Host Pull-up Driver (Ω) | Host Platform Components (Ω) | Pull-down Termination (Ω) at Bump | Pull-up Termination (Ω) at connector | Device Pull-down Termination (Ω) | Vbump (V) | HS Pull-up Rcomp Offset Required (bits) |
|---|---|---|---|---|---|---|
| 45 | 5 | 50 | 55 | 45 | 0.526 | 5 |
| 45 | 10 | 55 | 65 | 45 | 0.550 | 10 |
| 45 | 15 | 60 | 75 | 45 | 0.571 | 15 |
| 45 | 20 | 65 | 85 | 45 | 0.591 | 20 |
| 45 | 25 | 70 | 95 | 45 | 0.609 | 25 |

TABLE 2

Reference Voltage for Detection Mode

| s1<2:0> 610 | Vref_comp (V) 612 | |
|---|---|---|
| 000 | vref1 | 0.520 |
| 001 | vref2 | 0.550 |
| 010 | vref3 | 0.570 |
| 011 | vref4 | 0.590 |
| 100 | vref5 | 0.610 |

As illustrated in Table 1, the present techniques approximate the resistance of the platform components and board/package traces in multiples of 5Ω per step. A Finite State Machine (FSM) 608 will be ON and will increment bit by bit to determine the proper Vref value. In an example, the FSM counts up the s1<2:0> 610 (and listed in Table 2) from 000 to 100 to adjust the Vref_comp 612 to a corresponding Table 2 value until the comparator 602 output is triggered to trip from "0" to "1." The Vref_comp 612 is adjusted by selecting multiple Vrefs as listed in Table 2 from a multiplexer 614 as s1<2:0> is incremented. Once the comparator output trips, the Vbump level is identified.

Figure 6B:
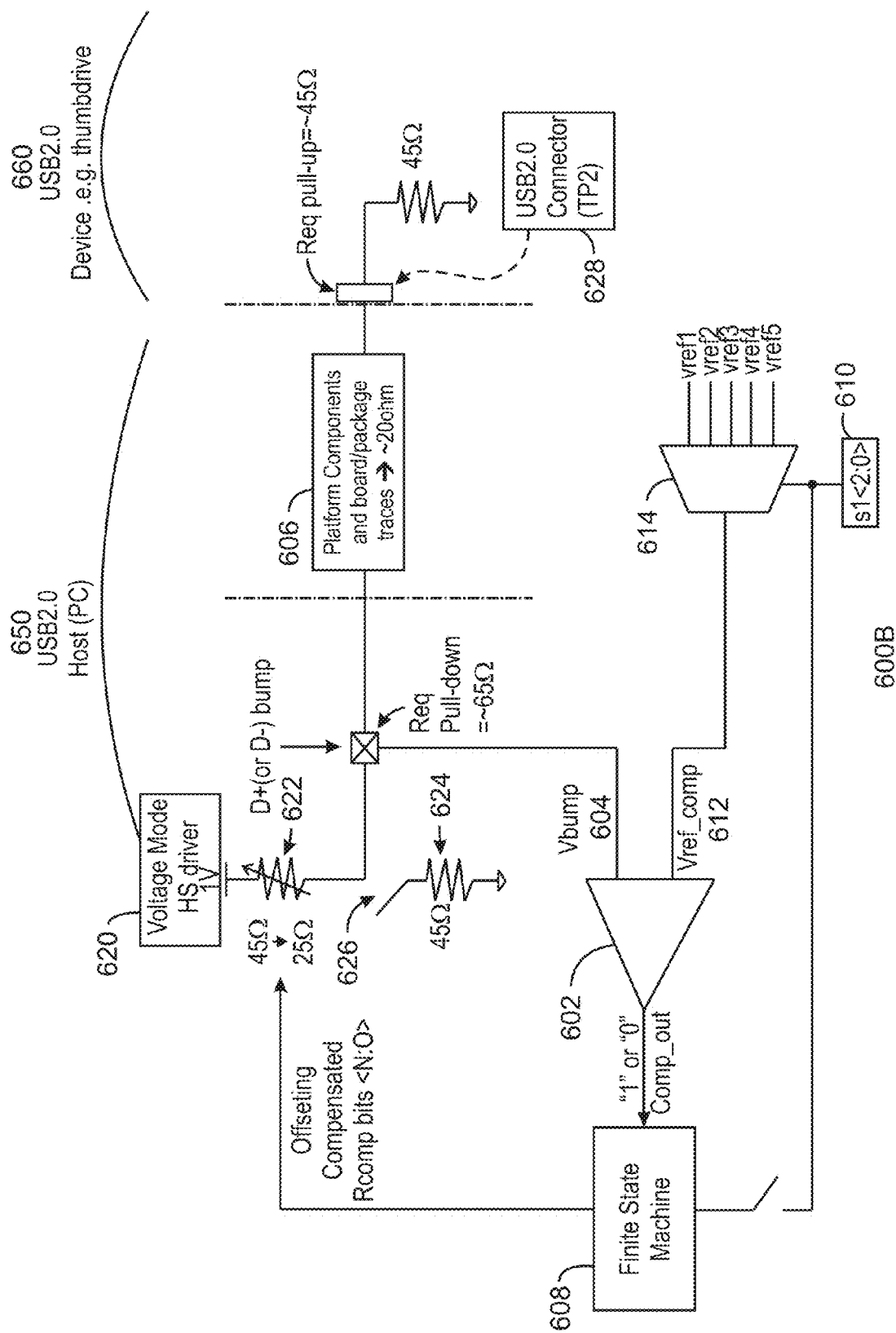
FIG. 6B is an illustration of the HS pull-up driver impedance adjustment mode.

FIG. 6B is an illustration of the HS pull-up driver impedance adjustment mode. During the pull-up driver impedance adjustment mode, the FSM 608 reads the detected Vbump voltage from the multiplexer 614 level thru the reference voltage s1<2:0> selected from reference number 610 and map the platform resistance value in the look up table (LUT) as shown in Table 1 to identify the amount of resistance that needs to be calibrated from the initial compensated HS pull up driver. For example, if the comparator 602 output trips when the s1<2:0> 610 has incremented to 011, then the detected Vbump voltage level is estimated to approximately 0.59V. According to Table 1, this voltage is represents into approximately 20Ω of the series resistance contributed by the platform components. The pull-up driver is adjusted by 20Ω.

To adjust the pull-up driver, the FSM 608 will offset the driver impedance to the detected "ohm level" based on the estimated resistance compensation (Rcomp) bits set in the lookup table (Table 1), depending on the HS pull-up driver step size per the least significant bit (LSB). For example, if 1 LSB bit is equivalent to 1Ω, then the FSM will offset the initial compensated pull-up Rcomp by 20 bits to reduce the pull up driver impedance from 45Ω to 25Ω. Hence, the final effectively pull up driver impedance seen at the connector (TP2) 628 will be closer to 45Ω. With this adjustment in the pull up driver impedance, the poor eye opening and eye height margin seen at the TP2 is corrected and the potential functionality issue can be avoided.

In embodiments, consistently obtaining similar Rcomp granularity per LSB across process, voltage, and temperature (PVT) may be difficult. A circuit designer can define the optimum number of Rcomp offset bits in the lookup table. Moreover, a residual impedance can exist after pull up driver impedance adjustment, which is dependent on the step size as define in the lookup table. The 5Ω per step in Table 1 is just an example, a circuit designer shall define their own step size e.g. coarse/fine tuning (ohm to be detected) from one Vref to another.

Figure 7:
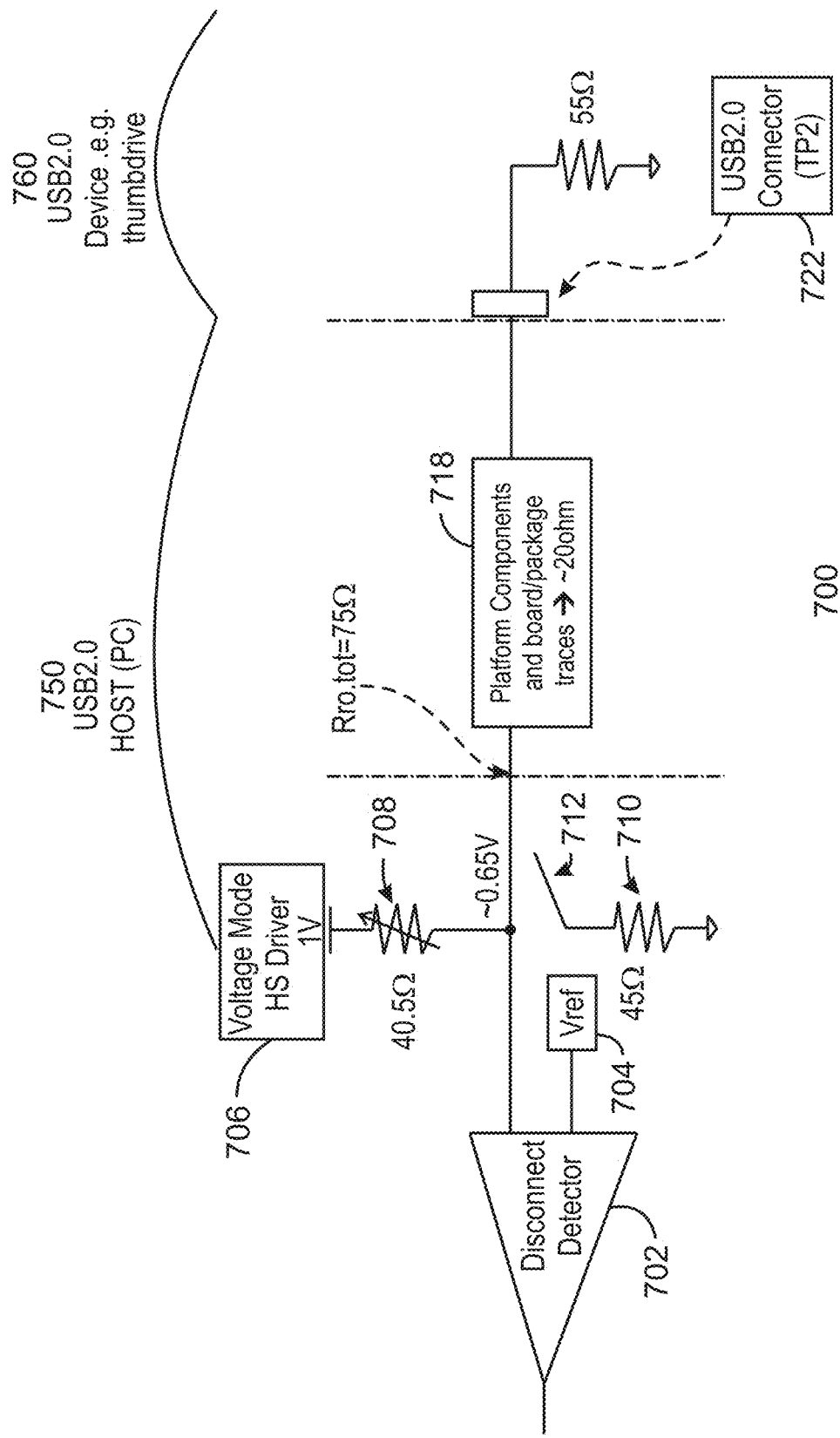
FIG. 7 illustrates of a USB 2.0 Host/Device platform implementation with a non-compliant device.

In some cases, a device connected to a calibrated platform is a non-compliant USB device. FIG. 7 illustrates of a USB 2.0 Host/Device platform implementation with a non-compliant device. A disconnect detector 702 may be used to determine the connection status of a USB device. In embodiments, the disconnect detector 702 includes a comparator. In order to determine the connection status of a USB connector, a reference voltage (Vref) 704 is used to detect a change in a differential voltage across USB differential traces by comparing the Vref 704 to the differential voltage. The differential voltage can be the difference between two input signals, such as Dp and Dn.

A voltage mode high speed (HS) driver 706 provides a voltage source of 1 volt (V). The voltage is applied to a 40.5Ω pull-up impedance at reference number 708. A 45Ω pull-down impedance at reference number 710 is provided when a switch 712 is closed in order to apply current across the 45Ω resistance at 708 to the 45Ω resistance at the ground.

In the example of FIG. 7, additional platform components 718 contribute approximately 20Ω of impedance to the USB 2.0 traces. A non-compliant USB device at USB connector 722 includes a device termination (pull-down) of 55Ω. A connect event or terminated Voh level can be as high as 0.65V due to the non-compliant USB device termination and additional platform resistance. The present techniques can be used to re-adjust the reference voltage (Vref 704) used by the disconnect detector and also any other receivers such as a Squelch detector to accommodate the platform complexity and non-compliant devices.

Figure 8:
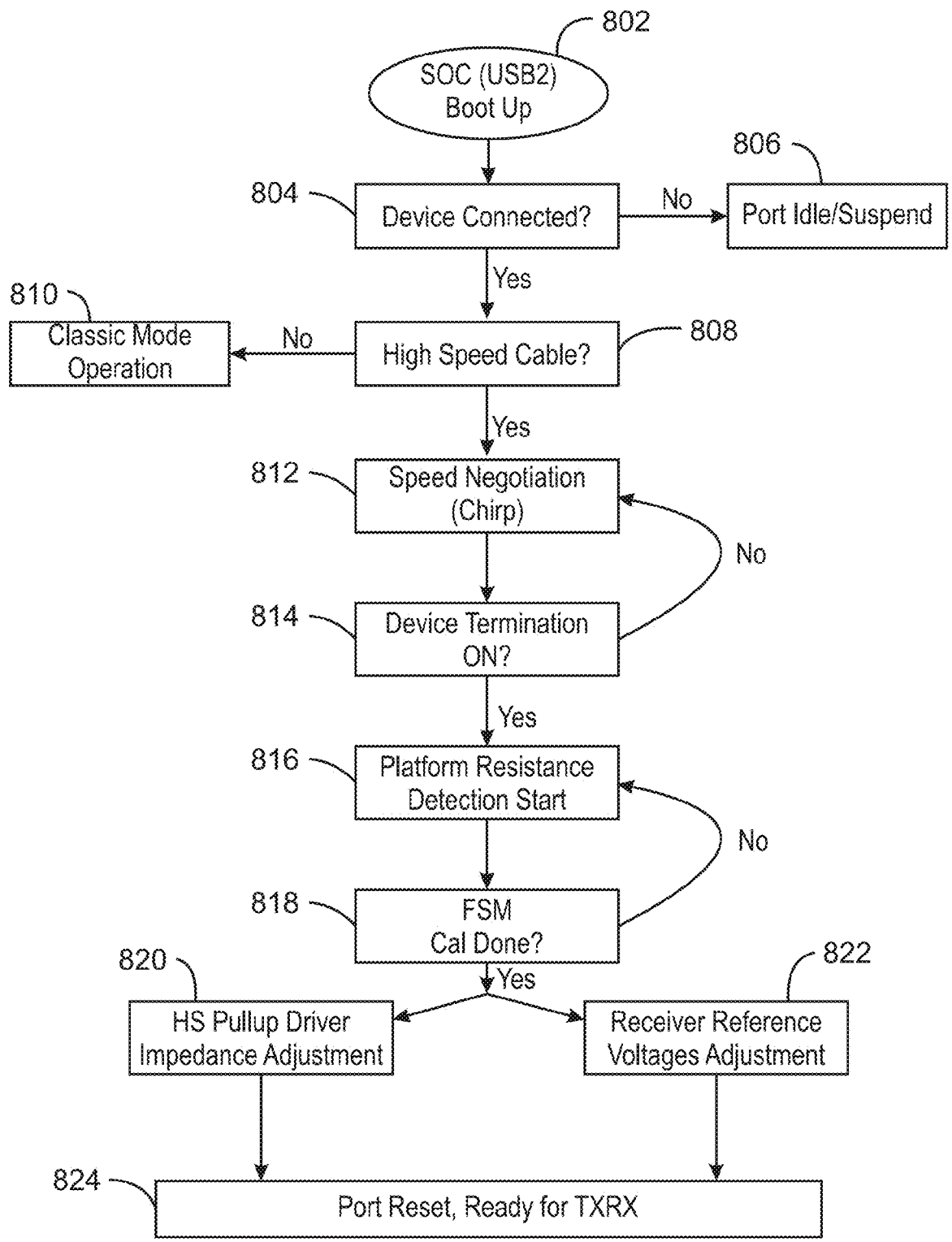
FIG. 8 is a process flow diagram of a method for calibrating impedance.

FIG. 8 is a process flow diagram of a method 800 for calibrating impedance. At block 802, the SOC, including a USB2.0 package, is booted up. Although USB is described herein, in embodiments, the device may be a USB, Peripheral Component Interconnect Express (PCIe) or any other serial I/O bus. The PCIe may be according to any PCI Specification, such as the PCI Express 3.0 Base Specification revision 3.0 released November 2010. At block 804, it is determined if a device is connected to a port of the platform. If a device is not connected to the platform, the port remains in a port idle/suspend state at block 806. If a device is connected to the platform, process flow continues to block 808. At block 808, it is determined if the connected device is to operate as a high speed device. If the connected device is not to operate as a high speed device, process flow continues to block 810. If the connected device is to operate as a high speed device, process flow continues to block 812.

At block 810 the device is to operate in a classic mode of operation. At block 812, speed negotiation begins during the chirping process as described above. At block 814, it is determined if the device termination is ON. If the device termination is not ON, process flow returns to block 812 for further speed negotiation. If the device termination is ON, process flow continues to block 816. At block 816, platform resistance detection begins. During platform resistance detection, the calibrated resistance is determined based on the pull up voltage observed at the voltage mode driver.

At block 818, it is determined if the FSM calibration process is complete. If the FSM calibration process is not complete, process flow returns to block 816. If the FSM calibration process is complete, process flow continues to blocks 820 and 822. At block 820 the HS pull up driver impedance is adjusted. At block 822 the receiver reference voltages (Vref) are adjusted. At block 824, a port reset occurs, and the port is ready to transmit and receive data.

Figure 9:
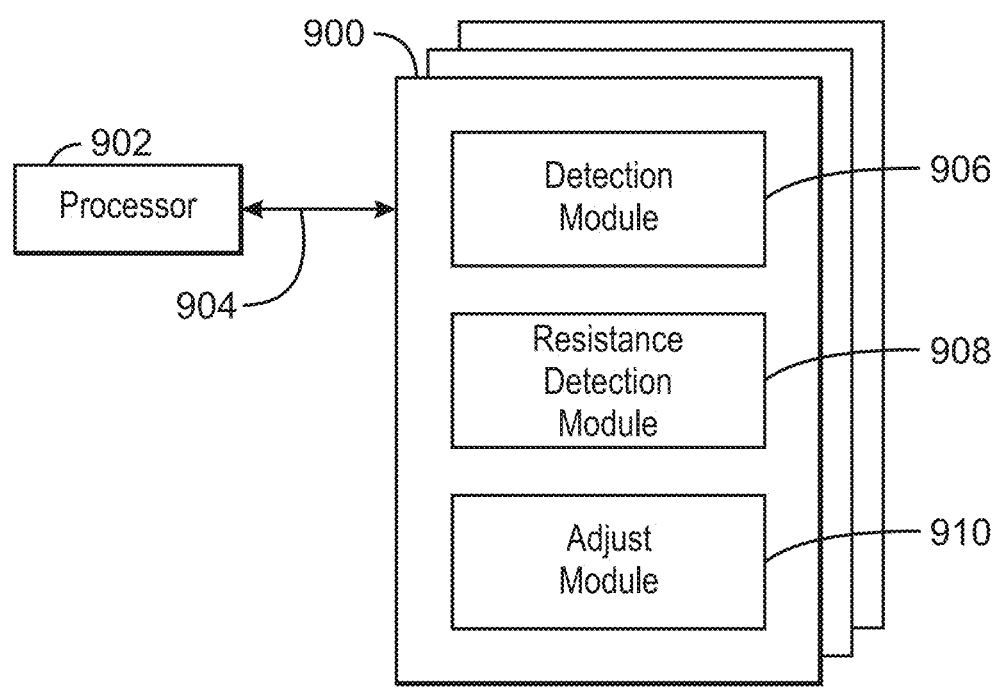
FIG. 9 is a block diagram showing tangible, non-transitory computer-readable media that stores code for a calibration scheme.

FIG. 9 is a block diagram showing tangible, non-transitory computer-readable media 900 that stores code for a calibration scheme. The tangible, non-transitory computer-readable media 900 may be accessed by a processor 902 over a computer bus 904. Furthermore, the tangible, non-transitory computer-readable medium 900 may include code configured to direct the processor 902 to perform the methods described herein.

The various software components discussed herein may be stored on one or more tangible, non-transitory computer-readable media 900, as indicated in FIG. 9. For example, a detection module 906 may be configured to detect the connection of a high speed device to the platform. A resistance detection module 908 may be configured to detect the resistance added by platform components. In embodiments, the added resistance is determined by a look up table. At block 910, an adjustment module is to adjust the high speed pull up driver impedance and the receiver reference voltages.

The block diagram of FIG. 9 is not intended to indicate that the tangible, non-transitory computer-readable media 900 is to include all of the components shown in FIG. 9. Further, the tangible, non-transitory computer-readable media 900 may include any number of additional components not shown in FIG. 9, depending on the details of the specific implementation.

Example 1

An apparatus is described herein. The apparatus includes a high speed pull up driver and a comparator. The high speed pull-up driver has a variable output impedance. The comparator is coupled to the high speed pull-up driver, and is to compare an output voltage of the high speed pull-up driver to a reference voltage, and to signal a result of the comparison to a finite state machine, the finite state machine to select the reference voltage for the comparison and to control the output impedance of the high speed pull-up driver based on the result of the comparison and the selected reference voltage.

The apparatus may include additional impedance from a plurality of electrical components, wherein the output impedance is controlled based on the additional impedance. The output impedance may be controlled to be approximately 45 ohms. Detection of the output impedance may occur when a driver termination exists. The reference voltage may to correspond to a platform resistance value. Additionally, the reference voltage may be mapped to a platform resistance value via a look up table. The reference voltage can be mapped to a platform resistance value via a look up table and the look up table includes a corresponding resistance compensation value. The output impedance may be adjusted to ensure high quality data transmission. The reference voltage can adjust a receiver voltage of a device. The device may be a USB device.

Example 2

A system is described herein. The system includes a device. The device is to couple with a host, and in response to the device being coupled with the host, a platform resistance detection is performed where a reference voltage that is to drive an output of a comparator high is mapped to a corresponding resistance compensation value to be applied to a pull up resistance of the host.

A finite state machine may determine the reference voltage that is to drive an output of a comparator high via a reference voltage table. The platform resistance may be a resistance as measured at a connector of the device during a chirp event. The platform resistance can be adjusted to be approximately 45 ohms. The detection of the resistance can occur when a driver termination exists. The platform resistance may be adjusted based on the reference voltage and a look up table for platform resistance compensation. The look up table values can be computed using a voltage divider concept. Platform resistance detection and adjustment may occur during a device Chirp-K period immediately following a first host reset. Additionally, resistance may be adjusted to ensure a corresponding eye diagram is clear. The device may be a USB device.

Example 3

A method is described herein. The method includes estimating a first voltage level and adjusting a reference voltage level until a comparator is tripped, wherein the first voltage level and the reference voltage are inputs to the comparator. The method also includes determining platform resistance based on the adjusted reference voltage and adjusting the platform resistance to maintain high speed data integrity.

The first voltage level may be Vbump. The first voltage level may also be estimated using a voltage divider concept. Platform resistance may be determined during a chirp event. Adjustments and platform resistance determination may be performed when a device physical layer (PHY) pull-down termination occurs and a host continues to drive a low frequency Chirp K-J signal. A reference voltage may be re-adjusted at a plurality of receivers. The platform resistance can be adjusted by offsetting bits of a pull-up resistor. A lookup table is used to determine the number of offset bits. Additionally, the adjusted platform resistance may conform to a USB2.0 HS eye diagram. Further, adjusting the reference voltage can occur when a driver termination exists.

Example 4

An apparatus is described herein. The apparatus includes a plurality of electrical components, wherein at least one component is to increase a total impedance at a port. The apparatus also includes a means to determine an additional impedance from the plurality of electrical components at the port and adjust the impedance to maintain signal integrity along a trace to the port in response to a device being coupled with the port.

The impedance may be measured at a connector of the device coupled with the port. In examples, the impedance may be adjusted to be approximately 45 ohms. Detection of the impedance may occur when a driver termination exists. A finite state machine may determine a reference voltage, wherein the reference voltage is to correspond to a platform resistance value. The reference voltage may be mapped to a platform resistance value via a look up table. Additionally, the look up table may include a corresponding resistance compensation value, and the resistance compensation value is used to adjust the impedance. The impedance may be adjusted to ensure high quality data transmission. Further, the reference voltage may be used to adjust a receiver voltage of the device. Also, the port may be a USB port.

Example 5

A tangible, non-transitory, computer-readable medium is described herein. The computer-readable medium comprises code to direct a processor to detect the connection of a high speed device to a platform and detect the resistance added by platform components. The computer-readable medium also comprises code to direct a processor to adjust the high speed pull up driver impedance and the receiver reference voltages.

A voltage (Vbump) may be estimated, and a reference voltage may be adjusted until a comparator is tripped, wherein the Vbump and the reference voltage are inputs to the comparator. The Vbump may be estimated using a voltage divider concept. The platform resistance may be determined during a chirp event. The resistance can be detected and the high speed pull up driver impedance may be adjusted when a device physical layer (PHY) pull-down termination occurs and a host continues to drive a low frequency Chirp K-J signal. A reference voltage may be re-adjusted at a plurality of receivers. The pull up driver impedance may be adjusted by offsetting bits of a pull-up resistor. A lookup table may be used to determine the number of offset bits. Additionally, a pull up driver impedance may conform to a USB2.0 HS eye diagram. Detecting the connection of a high speed device to a platform can occur when a driver termination exists.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals, etc.), which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
   a high speed pull-up driver having a variable output impedance, wherein the high speed pull-up driver provides a voltage source of one volt;
   a comparator coupled to the high speed pull-up driver to compare an output voltage of the high speed pull-up driver to a reference voltage, and to signal a result of the comparison to a finite state machine, the finite state machine to select the reference voltage for the comparison and to control the output impedance of the high speed pull-up driver based on the result of the comparison and the selected reference voltage, wherein the reference voltage and the voltage source of the high speed pull-up driver are inputs to the comparator.

2. The apparatus of claim 1, comprising an additional impedance from a plurality of electrical components, wherein the output impedance is controlled based on the additional impedance.

3. The apparatus of claim 1, wherein the output impedance is controlled to be approximately 45 ohms.

4. The apparatus of claim 1, wherein detection of the output impedance occurs when a driver termination exists.

5. The apparatus of claim 1, wherein the reference voltage is to correspond to a platform resistance value.

6. The apparatus of claim 1, wherein the reference voltage is mapped to a platform resistance value via a look up table.

7. The apparatus of claim 1, wherein the reference voltage is mapped to a platform resistance value via a look up table and the look up table comprises a corresponding resistance compensation value.

8. The apparatus of claim 1, wherein the output impedance is adjusted to ensure high quality data transmission.

9. The apparatus of claim 1, wherein the reference voltage is to adjust a receiver voltage of a device.

10. A system, comprising:
    a device, wherein the device is to couple with a host, and in response to the device being coupled with the host, a platform resistance detection is performed where a reference voltage that is to drive an output of a comparator high is mapped to a corresponding resistance compensation value to be applied to a pull up resistance of the host, wherein the reference voltage and a high speed pull-up driver voltage source are inputs to the comparator.

11. The system of claim 10, wherein a finite state machine is to determine the reference voltage that is to drive an output of a comparator high via a reference voltage table.

12. The system of claim 10, wherein the platform resistance is a resistance as measured at a connector of the device during a chirp event.

13. The system of claim 10, wherein the platform resistance is adjusted to be approximately 45 ohms.

14. The system of claim 10, wherein detection of the resistance occurs when a driver termination exists.

15. The system of claim 10, wherein the platform resistance is adjusted based on the reference voltage and a look up table for platform resistance compensation.

16. The system of claim 10, wherein a look up table is computed using a voltage divider concept.

17. The system of claim 10, wherein platform resistance detection and adjustment is to occur during a device Chirp-K period immediately following a first host reset.

18. The system of claim 10, wherein resistance is adjusted to ensure a corresponding eye diagram is clear.

* * * * *